May 8, 1923.
J. A. CHRISTEN
1,454,505
MULTIPLE CONTROL SYSTEM FOR MULTIMOTORED AIRCRAFT
Filed March 31, 1919    3 Sheets-Sheet 3
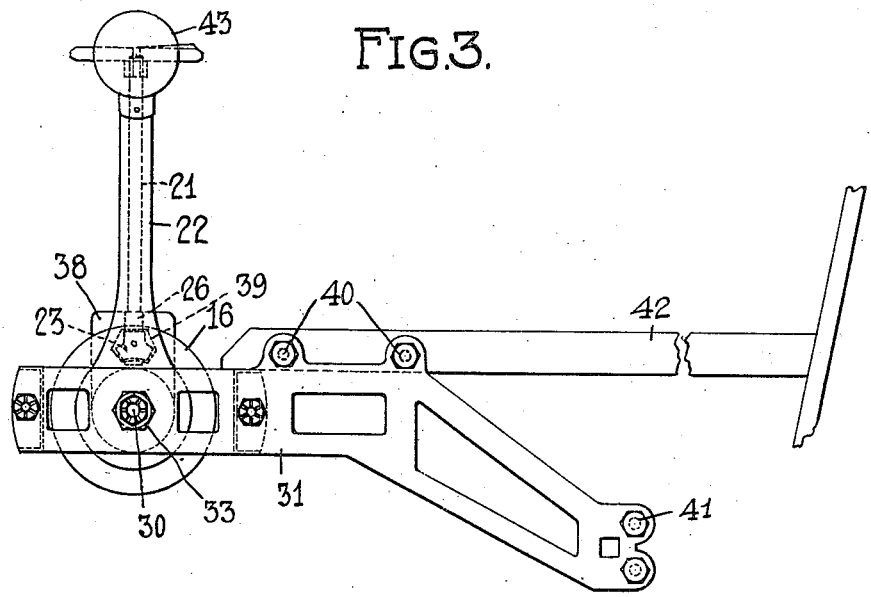
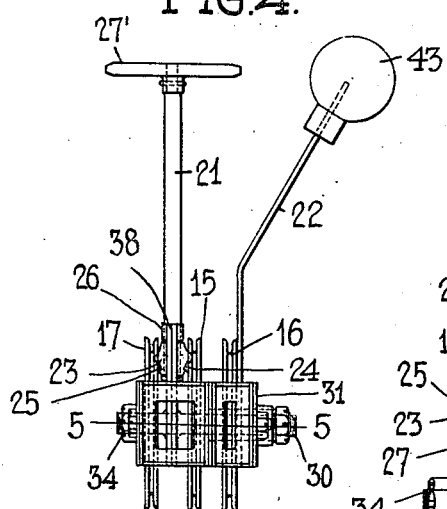
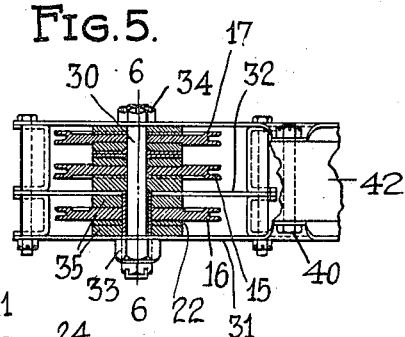
Inventor
JOHN A. CHRISTEN.
By his Attorney Patented May 8, 1923.

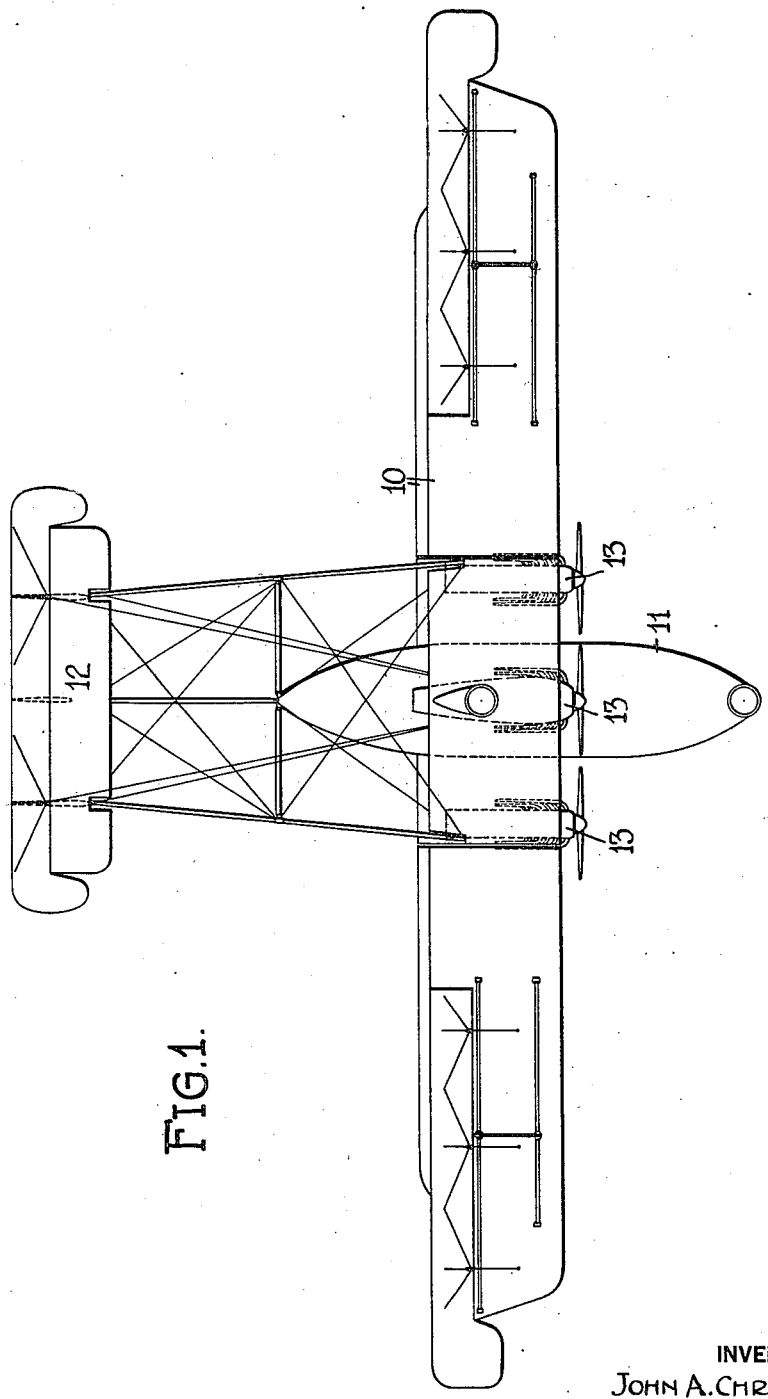

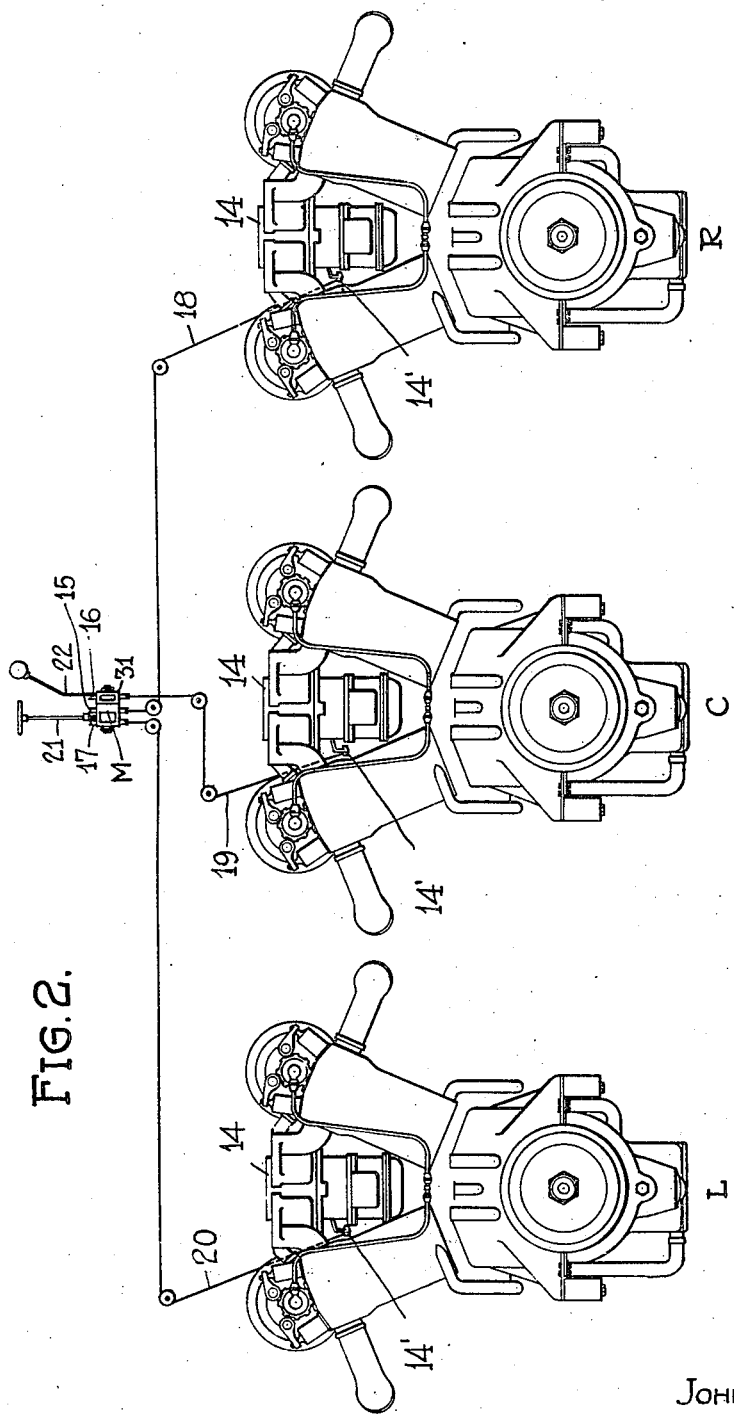

1,454,505

UNITED STATES PATENT OFFICE.

JOHN A. CHRISTEN, OF ROOSEVELT, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

MULTIPLE CONTROL SYSTEM FOR MULTIMOTORED AIRCRAFT.

Application filed March 31, 1919. Serial No. 286,469.

*To all whom it may concern:*

Be it known that I, JOHN A. CHRISTEN, a citizen of the United States, residing at Roosevelt, in the county of Nassau and State of New York, have invented certain new and useful Improvements in Multiple Control Systems for Multimotored Aircraft, of which the following is a specification.

My invention relates to multiple control systems for a plurality of prime movers and more particularly to multiple motor control systems for aircraft of the multimotored type.

In the application of Glenn H. Curtiss filed December 11, 1914 and since issued as Letters Patent No. 1,223,316, provision is made for regulating either or both motors of a twin-motored aircraft thru the operation of two control levers arranged side by side. The arrangement of the control levers is such that they may be independently operated or, if desired, grasped together in one hand and operated simultaneously. It is necessary, however, in regulating the speed of said two motors to operate both levers since the invention contemplates the use of an individual control lever for each motor unit.

The present invention is an improvement upon the Curtiss system. Instead of providing a separate control lever for each motor unit but one control lever is provided for two motors. The control lever is operable to either similarly or simultaneously adjust the speed regulating devices for the two motors or to oppositely and simultaneously adjust them. When similarly and simultaneously adjusted both motors are either accelerated or throttled down. When oppositely and simultaneously adjusted one motor is accelerated and the other throttled down. Thus there is provided a means for either similarly and simultaneously or oppositely and simultaneously regulating the speed of two motors thru the operation of but a single lever. Preferably the two motors are symmetrically mounted upon opposite sides of the fore and aft axis of the craft. This location makes it entirely practical to steer the craft to either the port or starboard by simply accelerating the speed of the outside motor and simultaneously throttling the speed of the inside motor. For straight flying the two motors are either accelerated or throttled simultaneously.

In addition to the use of one lever for regulating the speed of two motors, the invention is characterized by the provision of a second control lever and a third motor. The third motor is preferably located in the transverse vertical plane of the fore and aft axis of the craft and is designed to be controlled independently of the remaining two. The second control lever however, is preferably located in such proximity to the first mentioned control lever as to admit of the two control levers being grasped together in one hand for simultaneous operation. In this way the three motors may be either simultaneously accelerated or simultaneously throttled down to suit operating conditions. Moreover, if desired, the centrally located motor may be entirely cut out independently of the remaining two, and the craft operated on the two outside motors alone.

In the drawings wherein like characters of reference designate like or corresponding parts, Fig. 1 is a plan view of an airplane having its motors arranged as herein provided;

Fig. 2 is a front diagrammatic view showing the connection between the several motor units and the speed regulating devices;

Fig. 3 is a side elevation of the control mechanism and its mounting;

Fig. 4 is a front elevation of the structure illustrated in Fig. 3;

Fig. 5 is a section on the line 5—5 of Fig. 4, and

Fig. 6 is an enlarged section on the line 6—6 of Fig. 5.

In the embodiment of the invention selected for illustration a hydro-machine of the flying boat type is disclosed. The machine comprises or rather includes the usual supporting surfaces 10, hull or body 11, empennage 12 and power plant 13, the latter consisting of three motor units designated respectively R, C and L. The motors R and L are symmetrically arranged, one upon one side of the fore and aft axis of the craft and the other upon the opposite side thereof. The motor C is intermediately located between the motors R and L, preferably in the transverse vertical plane of said axis. The reference characters R, C and L designate respectively the right hand motor, the centrally located motor and the left hand motor as viewed from the front of the machine. Each of the three motors illustrated is of a well known type embodying the use of a duplex carbureter system and single throttle lever control. The carbureters of the motors R, C and L are each designated as 14 and the throttle control levers as 14'.

At a point distantly removed from the motors R, C and L suitable control mechanism designated as M is provided. It comprises a number of speed regulating devices corresponding with the number of motors. Said speed regulating devices designated respectively 15, 16 and 17 are illustrated as in the form of pulleys over which suitable control leads 18, 19 and 20 are trained. The control lead 18 extends from the pulley or drum 15 of the control mechanism M to the throttle control lever 14' of the motor R, the control lead 19 from the pulley or drum 16 to the throttle control lever 14' of the motor C and the control lead 20 from the pulley or drum 17 to the throttle control lever 14' of the motor L. In addition to the speed regulating devices 15, 16 and 17 the control mechanism M comprises two levers 21 and 22. The lever 21 is movable about an axis extending longitudinally of its length and also about an axis at right angles. It is provided at or near its lower end with a pinion 23 which is in mesh with arcuate gear segments 24 and 25 formed respectively upon the adjacent faces of the pulleys 15 and 17. The pinion 23 is keyed or otherwise rigidly secured to the lever 21 and the lever 21 is mounted in bearings 26 and 27 located respectively on opposite sides of the pinion. Both bearings are movable with the lever 21 about its transverse axis although fixed relatively thereto if moved about the axis extending longitudinally of its length. At its free end the lever 21 is provided with a hand wheel 27' that it may be readily turned.

The lever 22 unlike the lever 21 is incapable of movement about an axis extending longitudinally of its length, tho similar to the lever 21 in that it may be moved about an axis at right angles to its length and in continuation of the transverse axis of the lever 21. Instead of being geared to the pulley at its lower end the lever 22 is fastened as at 28.

The pulley, however, with which the lever 22 is associated is set apart from the pulleys with which the lever 21 is associated and although mounted to rotate about the extended axis of the pulleys 15 and 17 is mounted upon a hollow shaft 29 made separate and apart from the shaft upon which the pulleys 15 and 17 are mounted. The latter shaft is designated as 30. Both shafts however, are mounted upon a suitable frame 31, the shaft 30 being extended thru the shaft 29. The frame 31 is centrally partitioned as at 32 to receive the inner end of the hollow shaft 29. Lock nuts 33 and 34 hold the shaft 30 in place.

Between the partition 32 and the opposite sides of the frame 31 suitable fiber washers 35 are provided. These washers, of which there are six are arranged to frictionally engage both faces of each of the pulleys 15, 16 and 17 and, thru the frictional resistance which they offer upon the pulleys, have a tendency to hold them in their respective adjusted positions. If desired, the fiber washers intermediately located between the pulleys 15 and 17 may be slightly inset as at 36.

The means for supporting the lever 21 in the manner indicated comprises in addition to the bearings 26 and 27 a suitable frame 38. This frame is carried by the shaft 30 and at or near the bearings 26 and 27 is provided with an opening 39 within which the pinion 23 operates. It is apparent therefore that the turning movement of the lever 21 has no effect whatsoever upon the movement of the frame 38 whereas the movement of the lever 21 about its transverse axis is guided by said frame.

Preferably the control mechanism M is within reach of the pilot or operator. The bracket 31 it will be noted (see Fig. 3) is bolted as indicated at 40 to the pilot's seat and for added strength is also bolted as indicated at 41 to another structural element of the airplane (not shown). The pilot's seat, designated 42, may be located as desired, although in the embodiment of the invention illustrated it is mounted in a suitable nacelle or body located between the supporting surfaces 10 centrally of the machine.

If, in operation, it is desired that the machine be steered to either the right or left without the aid of or in conjunction with the rudder it is only necessary to operate the lever 21. To steer to the right the lever 21 is turned to the right. As it is turned the pinion 23 oppositely rotates the pulleys 15 and 17. The rotation of the pulley 15 in one direction and the rotation of the pulley 17 in the opposite direction simultaneously throttles the motor R and accelerates the motor L, thus causing the machine to turn to the right due to the preponderance of thrust effort at the left hand side of the machine. To turn to the left the lever 21 is oppositely rotated. For straight flying the lever 21 is moved about its transverse axis. If moved ahead the pinion 23 similarly and simultaneously rotates the pulleys 15 and 17 and as they are thus moved in a like manner both motors R and L are accelerated. If the lever 21 is pulled forward by the pilot both motors R and L are throttled. It is obvious therefore that the lever 21 is relied upon to either similarly and simultaneously or oppositely and simultaneously regulate the operating speed of the two outside motors. Due to its central location the motor C is independently controlled. By moving the lever 22 either forwardly or backwardly motion is imparted to the pulley 16 and to the throttle control lever 14 of the motor C. In this way the center motor is either accelerated or throttled. As indicated both levers 21 and 22 are mounted in such adjacency as to admit of the operator grasping them in one hand to simultaneously operate them. In this way the three motors may be either accelerated or throttled simultaneously. The two outside motors however are regulated by the movement of the lever 21, which movement may take place whether or not and regardless of the operating speed of the center motor. For convenience in operation the lever 22 is provided with a nob 43 and is offset intermediately of its ends to avoid interference with the hand wheel 27 of the lever 21.

It should be understood in conclusion that it is not intended to limit the application of the invention to hydro-machines of the triple motored type, as the invention is equally as well applicable to other types of machines than the hydro and to machines having a power plant consisting of two or more than three motors. Moreover, it is immaterial what character of motor is employed. In determining the invention reference should be had to the claims.

What is claimed is:

1. A multiple control system for a plurality of motors including a speed regulating device for each motor, a control lever, a connection between the control lever and two of the speed regulating devices for adjusting both speed regulating devices simultaneously, a second control lever, and a connection between the second control lever and a third speed regulating device for adjusting said third regulating device independently of the remaining two, the arrangement of the control levers being such that, if desired, both levers may be grasped in one hand for operating the three speed regulating devices simultaneously.

2. A multiple control system for a plurality of motors including a speed regulating device for each motor, two control levers, one control lever being mounted about the extended axis of the other, a connection between one of the control levers and two of the speed regulating devices for simultaneously adjusting both speed regulating devices by movement of said lever and a connection between the second lever and a third speed regulating device for independently adjusting said third speed regulating device without in anyway effecting the adjustment of the two speed regulating devices first mentioned.

3. In an aircraft, the combination, of a plurality of motors, one motor being mounted upon one side of the fore and aft axis of the craft and another motor upon the opposite side thereof, a speed regulating device for each motor, and a single control lever movable to either similarly and simultaneously adjust both speed regulating devices for obtaining a uniformity in the operation of both motors or oppositely and simultaneously adjust both speed regulating devices for obtaining non-uniformity in the operation of the motors.

4. In an aircraft, the combination, of a plurality of motors, one motor being mounted upon one side of the fore and aft axis of the craft and another motor upon the opposite side thereof, a speed regulating device for each motor and one control lever to simultaneously adjust both speed regulating devices.

5. In an aircraft, the combination, of a plurality of motors, one motor being mounted upon one side of the fore and aft axis of the craft, one motor being mounted upon the opposite side of said axis and a third motor mounted in the longitudinal vertical plane of said axis, a speed regulating device for each motor, a control lever common to the speed regulating devices for the motors mounted at opposite sides of the fore and aft axis of the craft and a second control lever for the speed regulating device associated with the centrally located motor, both control levers being mounted in such proximity as to be grasped together in one hand for simultaneous operation.

In testimony whereof I hereunto affix my signature.

JOHN A. CHRISTEN.